(12) United States Patent
Brown et al.

(10) Patent No.: US 9,785,724 B2
(45) Date of Patent: Oct. 10, 2017

(54) SECONDARY QUEUE FOR INDEX PROCESS

(71) Applicant: Microsoft Corporation, Redmond, WA (US)

(72) Inventors: Kevin Brown, Woodinville, WA (US); Anatoly Grabar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 463 days.

(21) Appl. No.: 14/528,480

(22) Filed: Oct. 30, 2014

(65) Prior Publication Data

US 2016/0125003 A1 May 5, 2016

(51) Int. Cl.
*G06F 7/00* (2006.01)
*G06F 17/30* (2006.01)

(52) U.S. Cl.
CPC .............. *G06F 17/30946* (2013.01)

(58) Field of Classification Search
CPC ......... G06F 17/30321; G06F 17/30371; G06F 17/30342
USPC ....................................................... 707/741
See application file for complete search history.

(56) References Cited

U.S. PATENT DOCUMENTS

| 5,701,469 | A | 12/1997 | Brandli et al. |
| 7,966,307 | B2 | 6/2011 | Iwayama et al. |
| 8,239,391 | B2* | 8/2012 | Goyal ............... G06F 17/30619 707/746 |
| 8,560,550 | B2 | 10/2013 | Patterson |
| 8,949,653 | B1* | 2/2015 | Kayan ................ G06F 11/0709 714/1 |
| 2003/0093399 | A1* | 5/2003 | Clarke ............. G06F 17/30893 |
| 2005/0289394 | A1* | 12/2005 | Arrouye ................. G06F 1/329 714/15 |
| 2008/0126271 | A1* | 5/2008 | Zanlongo ............... G06Q 10/06 705/400 |
| 2009/0070101 | A1* | 3/2009 | Masuyama ....... G06F 17/30675 704/9 |
| 2009/0083835 | A1* | 3/2009 | Olson ................. H04L 63/1416 726/3 |

(Continued)

OTHER PUBLICATIONS

Klaric, et al., "Multi-Index Multi-Object Content-Based Retrieval", In IEEE Transactions on Geoscience and Remote Sensing, vol. 50, Issue 10, Oct. 2012, pp. 4036-4049.

*Primary Examiner* — Binh V Ho
(74) *Attorney, Agent, or Firm* — Turk IP Law, LLC

(57) ABSTRACT

An index server may be configured to collect content associated with an entity, and process the content for indexing at a primary index queue. At least one portion of the content may be marked for exclusion from the primary index queue, and the marked content may be transferred to a secondary index queue to be processed for indexing. A comprehensive index may be stored based on the processing performed at the primary and secondary index queues such that the content associated with the entity is wholly represented by indexed content. If the secondary index queue is disabled, automatically or in response to a request from the entity, the content processed for indexing at the primary index queue may be stored in an index excluding the marked content. In some examples, the comprehensive index and/or the index with excluded marked content may be provided to a compliance server for analysis.

18 Claims, 6 Drawing Sheets

(56) References Cited

U.S. PATENT DOCUMENTS

| | | | |
|---|---|---|---|
| 2010/0169321 A1* | 7/2010 | Wang | G06F 21/6227 |
| | | | 707/741 |
| 2011/0264668 A1 | 10/2011 | Hacker et al. | |
| 2012/0166513 A1* | 6/2012 | Fortune | G06F 17/30091 |
| | | | 709/201 |
| 2016/0098435 A1* | 4/2016 | Gokhale | G06F 17/30286 |
| | | | 707/741 |

* cited by examiner

SECONDARY QUEUE FOR INDEX PROCESS

BACKGROUND

Compliance features for indexing may require collecting properties across a large quantity and variety of content associated with an entity, such as a corporation. While current indexing techniques implement such compliance features to a degree, the focus is on the high probability of a small set of results as being what the entity is searching for. Accordingly, some of the content is skipped and/or ejected from the index during processing causing an incomplete representation of the content associated with the entity to be stored in the index.

Thus, the current indexing technique directly opposes the purpose of the compliance features, which is to collect, index, and store content that wholly represents the content associated with the entity such that accurate results may be provided to the entity in during a search.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to employing a secondary queue for an index process. Content associated with an entity may be collected and processed for indexing, where at least one portion of the content may be marked for exclusion from a primary index queue. The marked content may be transferred from the primary index queue to a secondary index queue to be processed for indexing. A comprehensive index based on the processing performed at the primary index queue and the secondary index queue may then be stored.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
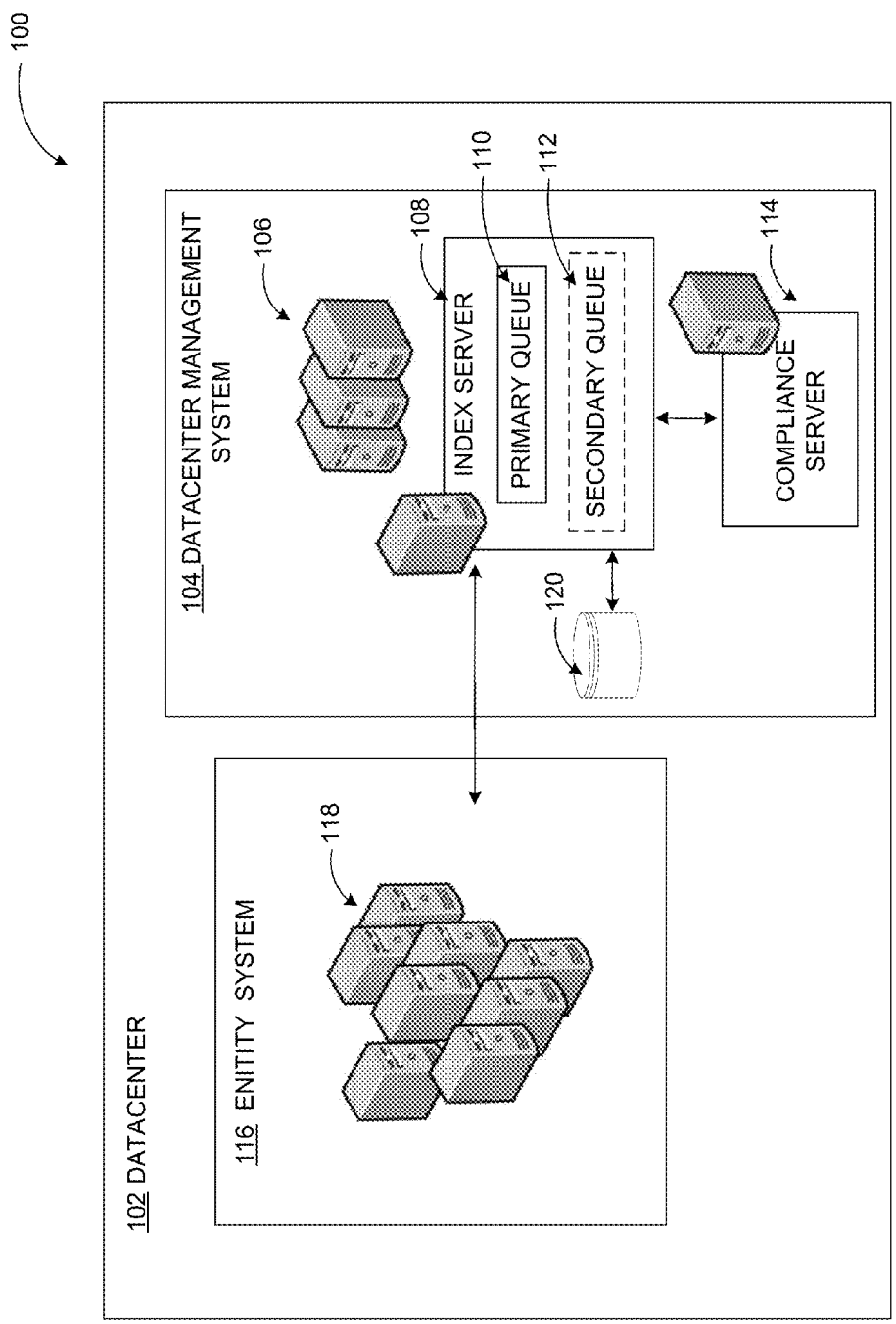
FIG. 1 includes an example network environment where a secondary index queue may be employed for an index process.

As briefly described above, an index server may be configured to collect content associated with an entity, and process the content for indexing at a primary index queue. At least one portion of the content may be marked for exclusion from the primary index queue, and the marked content may be transferred to a secondary index queue to be processed for indexing. A comprehensive index may be stored based on the processing performed at the primary and secondary index queues such that the content associated with the entity is wholly represented by the comprehensive index. If the secondary index queue is disabled, automatically or in response to a request from the entity, the content processed for indexing at the primary index queue may be stored in an index excluding the marked content. In some examples, the index server may be configured to provide the comprehensive index and/or the index excluding the marked content to a compliance server for analysis.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for employing a secondary queue for an index process. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a secondary index queue may be employed for an index process. As illustrated in diagram 100, a datacenter 102 may include a system 116 associated with an entity comprising one or more servers 118, and a datacenter management system 104 configured to manage the one or more servers 118 of the system 116 associated with an entity. The datacenter management system 104 may include one or more data management servers 106, of which, at least one may be operable to execute an index process (e.g., an index server 108) for content associated with the entity. The index server 108 may include a primary index queue 110 and/or a secondary index queue 112 for processing the content. Communication between the index server 108 and the one or more servers 118 of the system 116 associated with the entity may be facilitated by a communication module of the system. In some examples, at least one of the data management servers 106 may be operable to execute an analysis of the index generated by the index server 108 (e.g., a compliance server 114).

The entity may include an individual user, a business, a corporation, and/or an enterprise. For purposes of FIG. 1, the entity may be a corporation. The servers 118 of the system 116 associated with the entity may correspond to a multitude of computing devices, such as client devices of individual members of the corporation, for example. The servers 118 may execute a large number and variety of applications and thus, may generate a large quantity and variety of content associated with the entity. Each entity may have their own standards for collecting, indexing, and storing associated content with which the system 116 associated with the entity should be compliant. Accordingly, compliance features for indexing the content may require collecting properties across the large quantity and variety of content associated with the entity to ensure the content is wholly represented in the index such that accurate results may be provided to the entity upon a search. While current indexing techniques implement such compliance features to a degree, the focus is on high probability of a small set of results as being what the entity is searching for, causing some of the content to be skipped and/or ejected from the index during processing and thus, rendering an incomplete representation of the content.

In some embodiments, the index server 108 may be configured to collect content associated with the entity, where the content may include data, documents, and/or files, among other examples. The index server 108 may process the content for indexing at a primary index queue 110, where at least a portion of the content may be marked for exclusion from the primary index queue 110. The content may be marked for exclusion based on static and/or dynamic criteria, such as a size of the content, a number of links within the content, an ability of the content to be processed for indexing by the primary index queue 110, a freshness of indexing, a configuration of the entity, and/or resource availability of the entity, among other examples.

If the index server 108 includes a secondary index queue 112, and the secondary index queue 112 is enabled, the marked content may be transferred from the primary index queue 110 to the secondary index queue 112 to be processed for indexing. The index server 108 may store a comprehensive index at a database 120 associated with the index server 108, where the comprehensive index may be based on the processing performed at the primary and secondary index queues. In some examples, the index server 108 may be configured to retrieve the comprehensive index from the database 120 and provide the comprehensive index to the compliance server 114 in response to detection of a request from the entity. The compliance server 114 may be configured to analyze the comprehensive index to determine a representativeness of indexed content to the content associated with the entity. The compliance server 114 may be further configured to determine a level of compliance based on the analysis. The level of compliance may be based on a comparison of the determined representativeness of the indexed content to a representativeness standard of the entity for collecting, storing, and indexing associated content. In further examples, the compliance server 114 may be configured to generate a report to provide to the entity based on the analysis results.

In some embodiments, the secondary index queue 112 may be disabled by the index server 108. The secondary index queue 112 may be disabled in response to detection of a request from the entity to disable the secondary index queue 112. For example, while high priority and/or confidential content may need to be indexed such that indexed content is wholly representative of the high priority and/or confidential content, the entity may request to disable the secondary index queue 112 for low priority and/or unessential content such that processing time and cost is not wasted by transferring marked content to the secondary index queue 112. Additionally, the secondary index queue 112 may be disabled automatically by the index server 108. For example, the index server 108 may determine a type of the content, and if the content is defined by the entity as low priority and/or unessential content, the index server 108 may automatically disable the secondary index queue 112. In some embodiments, the transfer of the marked content from the primary index queue 110 to the secondary index queue 112 may be reestablished by enabling the secondary index queue 112 automatically or in response to a request from the entity to enable the secondary index queue 112.

Employing a secondary index queue for an indexing process, as described in the above embodiments, may enable content associated with an entity to be wholly represented in a comprehensive index such that accurate results may be provided to the entity upon a search. Furthermore, the disablement feature of the secondary index queue may enable only necessary content for compliance to be transferred to the secondary index queue such that processing time and computational cost is optimized.

Figure 2:
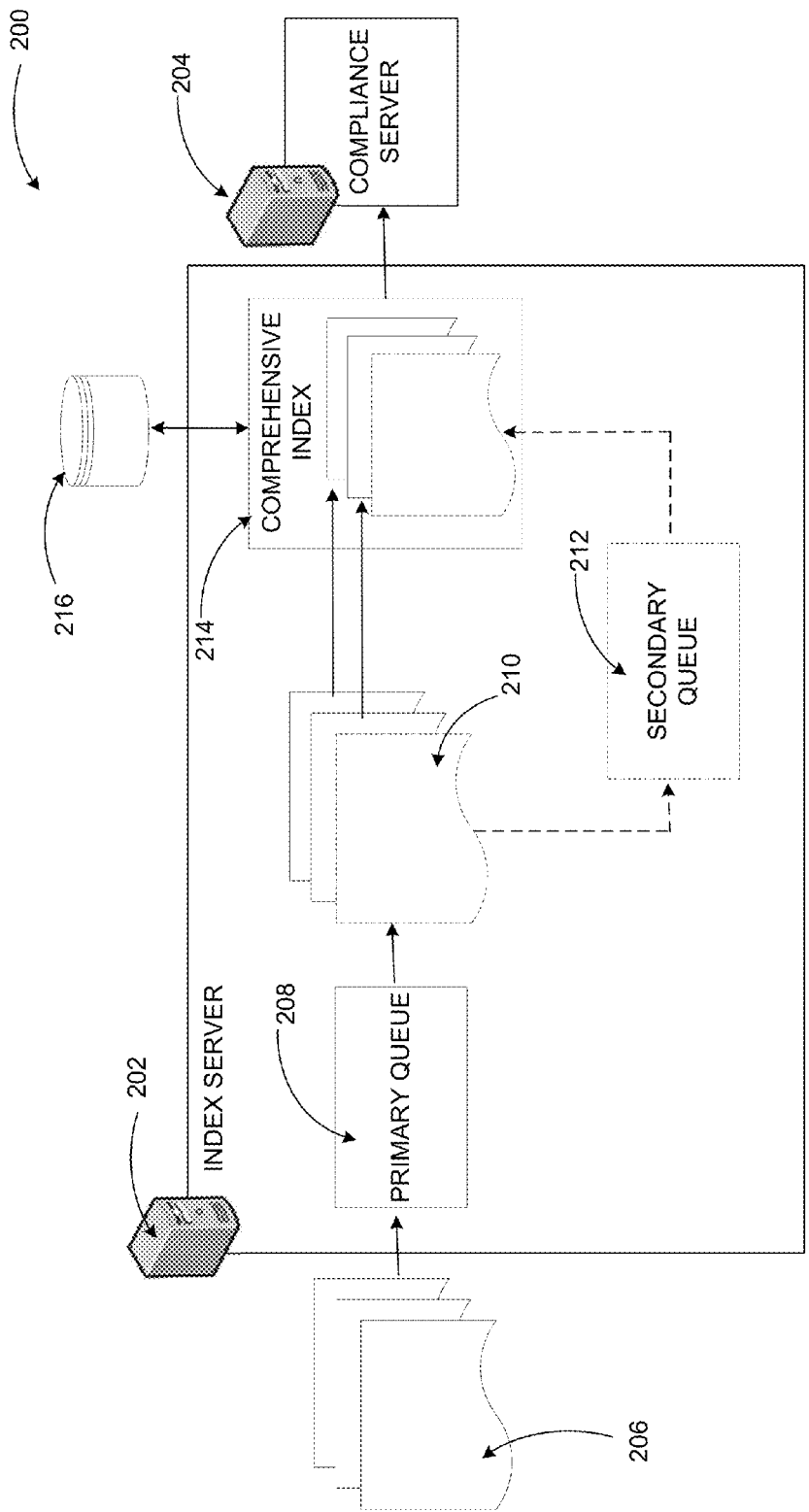
FIG. 2 illustrates an example system where a secondary index queue may be employed for an index process.

FIG. 2 illustrates an example system where a secondary index queue may be employed for an index process. As illustrated in diagram 200, a system may include an index server 202 comprising a primary index queue 208 and a secondary index queue 212, and a compliance server 204. The system may be a datacenter management system, as described in conjunction with FIG. 1, or a third party service, for example.

The index server 202 may be configured to collect content 206, such as data, documents, and/or files, associated with an entity such as an individual user, a business, a corporation, and/or an enterprise, for example. The index server 202 may be configured to process the content 206 for indexing at the primary index queue 208, where at least one portion of the content may be marked 210 for exclusion from the primary index queue 208. For example, the marked 210 content may be a document that is to large in size, has too few links, and/or is failing to process at the primary index queue 208. Other examples for exclusion may include a freshness of the primary index queue 208, a configuration of the entity, and/or resource availability of the entity.

The index server 202 may be configured to transfer the marked 210 content to a secondary index queue 212, where the marked 210 content may be processed for indexing. The index server 202 may then store a comprehensive index 214 at a database 216 associated with the index server 202. The comprehensive index 214 may be based on the processing performed at the primary index queue 208 and the secondary index queue 212 such that the comprehensive index 214 is wholly representative of the content associated with the entity.

In some embodiments, the index server 202 may retrieve the comprehensive index 214 from the database 216, and provide the comprehensive index 214 to the compliance server 204. The compliance server 204 may be configured to analyze the comprehensive index 214 to determine a representativeness of indexed content to the content 206 associated with the entity. The compliance server 204 may be further configured to determine a level of compliance based on a comparison of the determined representativeness of the indexed content and a representativeness standard of the entity for collecting, indexing, and storing content associated with the entity. When a secondary index queue 212 is employed, the compliance server 204 may determine the indexed content to be wholly representative of the content associated with the entity, and therefore a high level of compliance may be determined.

Figure 3:
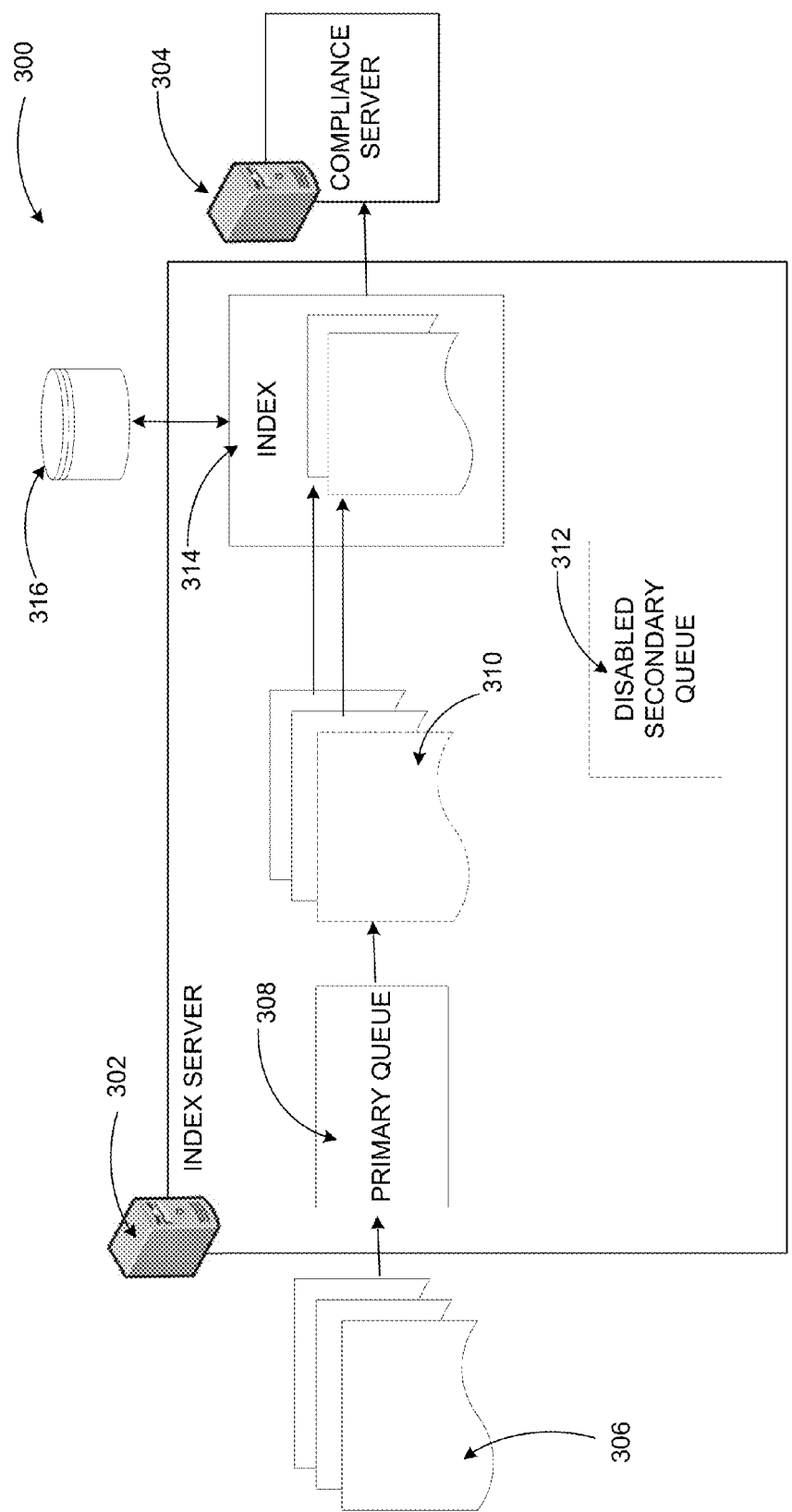
FIG. 3 illustrates an example system where a secondary index queue may be disabled for an index process.

FIG. 3 illustrates an example system where a secondary index queue may be disabled for an index process. As illustrated in diagram 300, a system may include an index server 302 comprising a primary index queue 308 and a disabled secondary index queue 312, and a compliance server 304. The system may be a datacenter management system, as described in conjunction with FIG. 1, or a third party service, for example.

The index server 302 may be configured to collect content 306, such as data, documents, and/or files, from an entity such as an individual user, a business, a corporation, and/or an enterprise, for example. The index server 302 may be configured to process the content 306 for indexing at the primary index queue 308, where at least one portion of the content may be marked 310 for exclusion from the primary index queue 308. For example, the marked 310 content may be a media file, and a configuration of the entity, and/or resource availability of the entity may prevent the media file from processing at the primary index queue 308. Other examples for exclusion may include a size of the content, a number of links the content has (i.e., specifically a small number and/or lack thereof), an inability of the content to process at the primary index queue 308, and/or a freshness of the primary index queue 308.

The index server 302 may disable the secondary index queue 312 in response to detection of a request from the entity to disable the secondary index queue 312. For example, the content 306 being collected and indexed may not need to be indexed such that the indexed content is wholly representative of the content 306, where the content 306 may be low priority and/or unessential content. Therefore, the entity may request to disable the secondary index queue 312 such that processing time and cost is not wasted by transferring marked 310 content to the secondary index queue 312. In other embodiments, the secondary index queue 312 may be disabled automatically by the index server 302. For example, the index server 302 may determine a type of the content 306, and if the content 306 is defined by the entity as low priority and/or unessential content, the index server 302 may automatically disable the secondary index queue 312.

With the secondary index queue 312 disabled, the marked 310 content is excluded from the primary index queue 308 and may not processed for indexing such that only the content processed for indexing at the primary index queue is represented in an index 314. The index 314 may be stored in a database 316 associated with the index server 302. In some embodiments, the index server 302 may retrieve the index 314 from the database 316 and provide the index 314 to the compliance server 304. The compliance server 304 may be configured to analyze the index 314 to determine a representativeness of indexed content to the content 306 associated with the entity. The compliance server 304 may be further configured to determine a level of compliance based on a comparison of the determined representativeness of the indexed content and a representativeness standard of the entity for collecting, indexing, and storing content associated with the entity. When the secondary index queue 312 is disabled, the compliance server 304 may determine the indexed content to not be completely representative of the content 306 associated with the entity. However, as previously discussed, the content 306 being collected and indexed may not need to be indexed such that the indexed content is wholly representative of the content 306, as the content 306 may be low priority and/or unessential content. Thus, based on the representativeness standard of the entity for such content, the compliance level may not be affected or the compliance level may be lowered from the previous example discussed in conjunction with FIG. 3.

Figure 4:
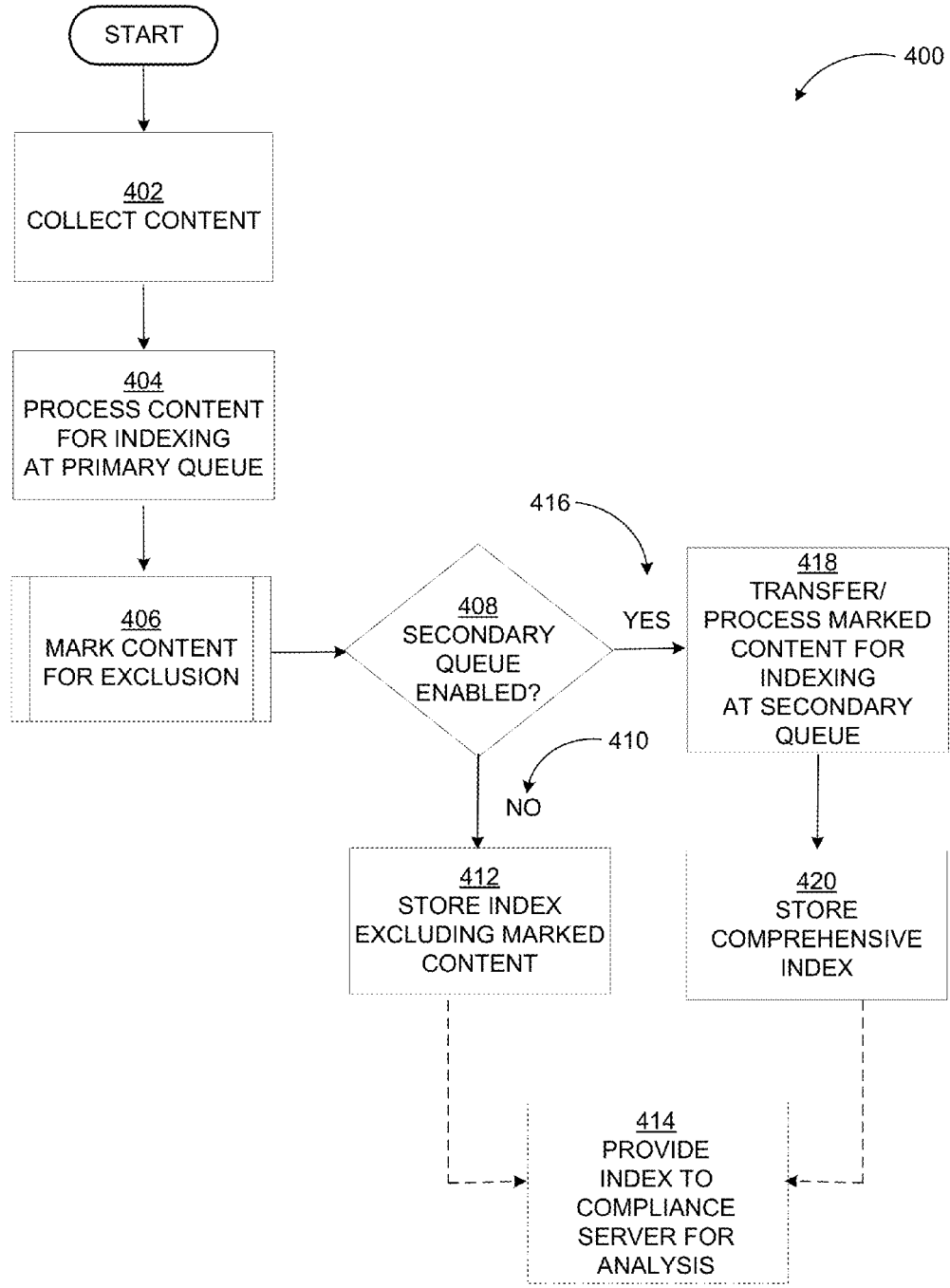
FIG. 4 illustrates an example index process.

FIG. 4 illustrates an example index process, according to embodiments. As illustrated in diagram 400, an index server configured to perform the index process may collect content 402 associated with an entity, and process the content 404 for indexing at a primary index queue.

The index server may be further configured to mark content 406 while processing the content. For example, at least a portion of the content may be marked for exclusion from the primary index queue. The content may be marked for exclusion based on static and/or dynamic criteria including a size of the content, a number of links within the content, an ability of the content to be processed for indexing by the primary index queue, a freshness of the primary index queue, a configuration of the entity, and/or resource availability of the entity, among other examples.

The index server may then be configured to determine if a secondary index queue is enabled 408. If the secondary index queue is not enabled 410, the content processed at the primary index queue may be stored in an index 412 with the marked content excluded. In some examples, the index may be provided to a compliance server for analysis 414. The compliance server may analyze the index to determine a representativeness of indexed content to the content associated with the entity. The compliance server may further determine a level of compliance based on a comparison of the determined representativeness of the indexed content and a representativeness standard of the entity for collecting, indexing, and storing content associated with the entity.

If the secondary index queue is enabled 416, the index server may transfer the marked content from the primary index queue to the secondary index queue to be processed for indexing 418. A comprehensive index may be stored 420 at a database associated with the index server, where the comprehensive index may be based on the processing performed at the primary index queue and the secondary index queue. In some examples, the comprehensive index, similar to the above-discussed primary index queue, may be provided to the compliance server for analysis 414. The compliance server may analyze the comprehensive index to determine a representativeness of indexed content to the content associated with the entity. The compliance server may further determine a level of compliance based on a comparison of the determined representativeness of the indexed content and a representativeness standard of the entity for collecting, indexing, and storing content associated with the entity.

The examples in FIGS. 1 through 4 have been described using specific network environments, systems, and processes to employ a secondary index queue for an index process. Embodiments to employ a secondary queue for an index process are not limited to the specific network environments, systems, and processes according to these examples.

Employing a secondary index queue for an indexing process, as described in the above embodiments, may enable content associated with an entity to be wholly represented in a comprehensive index such that accurate results may be provided to the entity upon a search. Accordingly, the employment of the secondary index queue may advantageously enhance a reliability of the search index, and improve usability for the entity. Furthermore, the disablement feature of the secondary index queue may enable only necessary content for compliance to be transferred to the secondary index queue such that processing time and computational cost is optimized.

Figure 5:
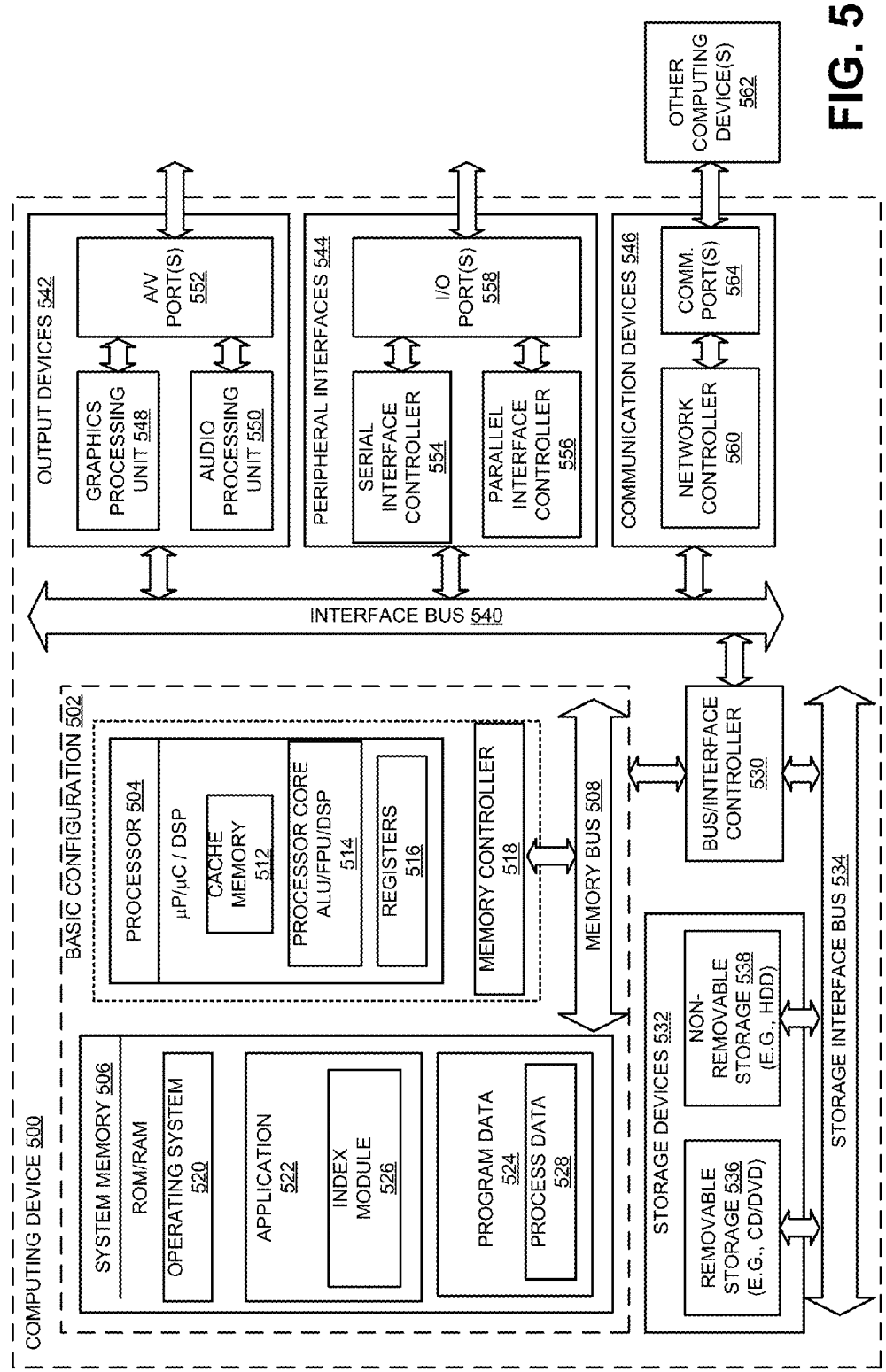
FIG. 5 is a block diagram of an example general purpose computing device, which may be used to employ a secondary index queue for an index process.

FIG. 5 and the associated discussion are intended to provide a brief, general description of a general purpose computing device, which may be used to employ a secondary index queue for an index process.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, an application 522, and program data 524. The application 522 may include an index module 526, which may be an integral part of the application or a separate application on its own. The index module 526 may be configured to collect content associated with an entity and process the content for indexing at a primary index queue and/or a secondary index queue. For example, at least one portion of the content may be marked for exclusion from the primary index queue, and thus may be transferred to the secondary index queue to be processed for indexing. A comprehensive index based on the processing performed at the primary index queue and the secondary index queue may then be stored and/or provided to a compliance server for analysis. The program data 524 may include, among other data, process data 528 related to the criteria for marking the at least one portion of the content for exclusion from the primary index queue, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to employ a secondary index queue for an index process. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
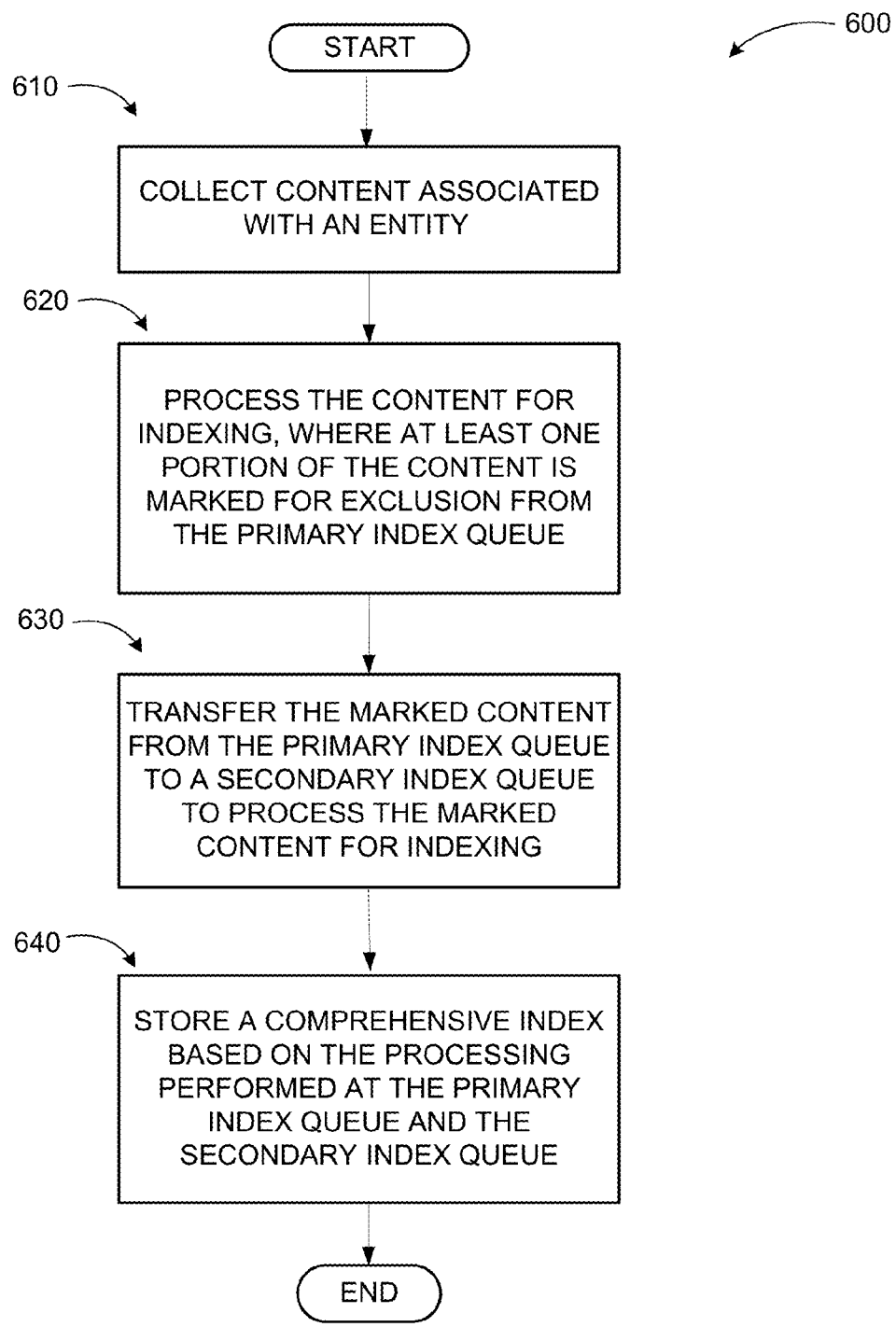
FIG. 6 illustrates a logic flow diagram of a method to employ a secondary index queue for an index process, according to embodiments.

FIG. 6 illustrates a logic flow diagram for process 600 of a method to employ a secondary index queue for an index process, according to embodiments. Process 600 may be implemented on a server or other system.

Process 600 begins with operation 610, where content associated with an entity may be collected by an index server of a system. Communication between the index server and one or more servers associated with the entity may be facilitated by a communication module of the system. In some examples, the system may be a management system of a datacenter associated with the entity client devices or a third party service.

At operation 620, the index server may be configured process the content for indexing at a primary index queue. At least one portion of the content may marked for exclusion from the primary index queue based on one or more criterion, which may be static or dynamic. Example criteria includes a size of the content, a number of links within the content, an ability of the content to be processed for indexing by the primary index queue, a freshness of the primary index queue, a configuration of the entity, and resource availability of the entity.

At operation 630, the index server may be configured to transfer the marked content from the primary index queue to a secondary index queue to process the marked content for indexing. In some examples, the index server may be configured to disable the secondary index queue causing the transfer of the marked content from the primary index queue to a secondary index queue to be prevented. The secondary index queue may be disabled automatically based on a type of the content, which may be defined by the entity, or in response to detection of a request from the entity to disable the secondary index queue. In some embodiments, the transfer of the marked content from the primary index queue to the secondary index queue may be reestablished by enabling the secondary index queue automatically or in response to a request from the entity to enable the secondary index queue.

At operation 640, the index server may be configured to store a comprehensive index based on the processing performed at the primary index queue and the secondary index queue. In some examples, the index server may be further configured to provide the comprehensive index to a compliance server. The compliance server may be configured to analyze the comprehensive index to determine a representativeness of indexed content to the content associated with the entity. Furthermore, the compliance server may be configured to determine a level of compliance by comparing the determined representativeness of the indexed content to the content associated with the entity to representativeness standards of the entity for collecting, indexing, and storing the content associated with the entity. In some examples, the compliance server may then be configured to generate a report based on the analysis results to provide to the entity.

The operations included in process 600 are for illustration purposes. Employment of a secondary queue for an index process may be implemented by similar processes with fewer or additional steps, as well as in different order of operations using the principles described herein.

According to some embodiments, a method that is executed at least in part on an index server to employ a secondary queue for an index process may be provided. The method may include a means for collecting content associated with an entity, a means for processing the content for indexing, where at least one portion of the content is marked for exclusion from a primary index queue, a means for transferring the marked content from the primary index queue to a secondary index queue to process the marked content for indexing, and a means for storing a comprehensive index based on the processing performed at the primary index queue and the secondary index queue.

According to some examples, methods to employ a secondary queue for an index process may be provided. An example method may be executed at least in part on an index server, and may include collecting content associated with an entity, and processing the content for indexing, where at least one portion of the content is marked for exclusion from a primary index queue. The example method may also include transferring the marked content from the primary index queue to a secondary index queue to process the marked content for indexing, and storing a comprehensive index based on the processing performed at the primary index queue and the secondary index queue.

In other examples, the comprehensive index may be provided to a compliance server for analysis. The marked content may be prevented from transferring from the primary index queue to the secondary index queue by disabling the secondary index queue. The secondary index queue may be disabled in response to a request from the entity to disable the secondary index queue. The secondary index queue may be automatically disabled based on a type of the content, where the type of the content is defined by the entity. An index may be stored comprising the content processed for indexing at the primary index queue with the marked content excluded when the secondary index queue is disabled.

In further examples, the transfer of the marked content from the primary index queue to the secondary index queue may be reestablished by enabling the secondary index queue one of automatically or in response to a request from the entity to enable the secondary index queue. At least one portion of the content may be marked for exclusion from the primary index based on static or dynamic criteria.

According to some embodiments, systems configured to employ a secondary queue for an index process may be described. An example system may include a communication module configured to facilitate communication between one or more servers associated with an entity and one or more servers of the system. The example system may also include an index server, where the index server may be configured to collect content associated with the entity, and process the content for indexing, where at least one portion of the content is marked for exclusion from a primary index queue based on static or dynamic criteria. The index server may be further configured to transfer the marked content from the primary index queue to a secondary index queue to process the marked content for indexing, and store a comprehensive index based on the processing performed at the primary index queue and the secondary index queue. The example system may further include a compliance server coupled to the index server, where the compliance server may be configured to receive the comprehensive index from the index server upon detection of a request from the entity, and analyze the comprehensive index.

In other embodiments, the analysis of the comprehensive index may determine a representativeness of indexed content to the content associated with the entity. The compliance server may be further configured to determine a level of compliance, where the determined level of compliance is based on a comparison of the determined representativeness of the indexed content to a representativeness standard of the entity for collecting, indexing, and storing the content associated with the entity. The compliance server may be further configured to generate a report based on the analysis of the comprehensive index to provide to the entity.

In further embodiments, the content may include unstructured data, documents, images, audio content, video content, and/or files associated with the entity. The entity is may be an individual user, a business, a corporation, and/or an enterprise. The criteria may include a size of the content, a number of links within the content, an ability of the content to be processed for indexing by the primary index queue, a freshness of the primary index queue, a configuration of the entity, and/or resource availability of the entity. The system may be a datacenter management system or a third party service.

According to some examples, computer-readable memory devices with instructions stored thereon to employ a secondary queue for an index process may be described. Example instructions may include collecting content associated with an entity, and processing the content for indexing, where at least one portion of the content is marked for exclusion from a primary index queue. The example instructions may also include transferring the marked content from the primary index queue to a secondary index queue to process the marked content for indexing, storing a comprehensive index based on the processing performed at the primary index queue and the secondary index queue, and providing the comprehensive index to a compliance server upon detection of a request from the entity.

In other examples, the marked content may be prevented from transferring from the primary index queue to the secondary index queue by disabling the secondary index queue in response to a request from the entity to disable the secondary index queue or disabling the secondary index queue automatically based on a type of the content. At least one portion of the content may be marked for exclusion from the primary index based on a size of the content, a number of links within the content, an ability of the content to be processed for indexing by the primary index queue, a freshness of the primary index queue, a configuration of the entity, and/or resource availability of the entity.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part on an index server to employ a secondary queue for an index process, the method comprising:

collecting content associated with an entity;

processing the content for indexing at a primary index queue, wherein at least one portion of the content is marked for exclusion from the primary index queue;

if a secondary index queue is enabled by the index server, transferring the marked content from the primary index queue to the secondary index queue to process the marked content for indexing; and storing a comprehensive index based on the processing performed at the primary index queue and the secondary index queue such that the content associated with the entity is wholly represented by the comprehensive index; and if the secondary index queue is disabled by the index server, preventing the marked content from transferring from the primary index queue to the secondary index queue; and storing an index based on the processing performed at the primary index queue with the marked content excluded.

2. The method of claim 1, further comprising:

providing the comprehensive index or the index to a compliance server for analysis.

3. The method of claim 1, further comprising:

disabling the secondary index queue in response to a request from the entity to disable the secondary index queue.

4. The method of claim 1, further comprising:

automatically disabling the secondary index queue based on a type of the content, wherein the type of the content is defined by the entity.

5. The method of claim 1, further comprising:

if the secondary index queue is disabled, reestablishing the transfer of the marked content from the primary index queue to the secondary index queue by enabling the secondary index queue one of automatically or in response to a request from the entity to enable the secondary index queue.

6. The method of claim 1, further comprising:

marking the at least one portion of the content for exclusion from the primary index based on one of static and dynamic criteria.

7. A system configured to employ a secondary queue for an index process, the system comprising:

a communication module configured to facilitate communication between one or more servers associated with an entity and one or more servers of the system;

an index server configured to:

collect content associated with the entity;
process the content for indexing at a primary index queue, wherein at least one portion of the content is marked for exclusion from the primary index queue based on one of static and dynamic criteria;
if the secondary index queue enabled by the index server,
    transfer the marked content from the primary index queue to the secondary index queue to process the marked content for indexing; and
    store a comprehensive index based on the processing performed at the primary index queue and the secondary index queue such that the content associated with the entity is wholly represented by the comprehensive index; and
if the secondary index queue is disabled by the index server,
    prevent the marked content from transferring from the primary index queue to the secondary index queue; and
    store an index based on the processing performed at the primary index queue with the marked content excluded; and
a compliance server coupled to the index server, the compliance server configured to:
    receive the comprehensive index if the secondary index queue is enabled or receive the index if the secondary index queue is disabled from the index server upon detection of a request from the entity; and
    analyze the comprehensive index or the index.

8. The system of claim 7, wherein the analysis of the comprehensive index or the index determines a representativeness of indexed content to the content associated with the entity.

9. The system of claim 8, wherein the compliance server is further configured to determine a level of compliance.

10. The system of claim 9, wherein the determined level of compliance is based on a comparison of the determined representativeness of the indexed content to a representativeness standard of the entity for collecting, indexing, and storing the content associated with the entity.

11. The system of claim 7, wherein the compliance server is further configured to generate a report based on the analysis of the comprehensive index or the index to provide to the entity.

12. The system of claim 7, wherein the content includes one or more of unstructured data, documents, images, audio content, video content, and files associated with the entity.

13. The system of claim 7, wherein the entity is one of an individual user, a business, a corporation, and an enterprise.

14. The system of claim 7, wherein the criteria include one or more of a size of the content, a number of links within the content, an ability of the content to be processed for indexing by the primary index queue, a freshness of the primary index queue, a configuration of the entity, and resource availability of the entity.

15. The system of claim 7, wherein the system is a datacenter management system or a third party service.

16. A computer-readable memory device with instructions stored thereon to employ a secondary queue for an index process, the instructions comprising:
at an index server;
    collecting content associated with an entity;
    processing the content for indexing at a primary index queue, wherein at least one portion of the content is marked for exclusion from the primary index queue;
    if the secondary index queue is enabled by the index server,
        transferring the marked content from the primary index queue to a secondary index queue to process the marked content for indexing;
        storing a comprehensive index based on the processing preformed at the primary index queue and the secondary index queue such that the content associated with the entity is wholly represented by the comprehensive index; and
        providing the comprehensive index to a compliance server upon detection of a request from the entity; and
    if the secondary index queue is disabled by the index server,
        preventing the marked content from transferring from the primary index queue to the secondary index queue;
        storing an index based on the processing performed at the primary index queue with the marked content excluded; and
        providing the index to the compliance server upon detection of the request from the entity.

17. The computer-readable memory device of claim 16, wherein the instructions further comprise:
one of disabling the secondary index queue in response to a request from the entity to disable the secondary index queue or disabling the secondary index queue automatically based on a type of the content.

18. The computer-readable memory device of claim 16, wherein the instructions further comprise:
marking the at least one portion of the content for exclusion from the primary index based on one or more of a size of the content, a number of links within the content, an ability of the content to be processed for indexing by the primary index queue, a freshness of the primary index queue, a configuration of the entity, and resource availability of the entity.

* * * * *